(12) United States Patent
Bao et al.

(10) Patent No.: US 9,453,774 B2
(45) Date of Patent: Sep. 27, 2016

(54) SURFACE AREA-BASED PRESSURE SENSING

(71) Applicants: The Board of Trustees of the Leland Stanford Junior University, Palo Alto, CA (US); Nanjing University, Nanjing (CN)

(72) Inventors: Zhenan Bao, Stanford, CA (US); Alex Chortos, Stanford, CA (US); Lijia Pan, Nanjing (CN)

(73) Assignees: The Board of Trustees of the Leland Stanford Junior University, Stanford, CA (US); Nanjing University, Nanjing (CN)

( * ) Notice: Subject to any disclaimer, the term of this patent is extended or adjusted under 35 U.S.C. 154(b) by 0 days.

(21) Appl. No.: 14/573,928

(22) Filed: Dec. 17, 2014

(65) Prior Publication Data

US 2015/0168236 A1 Jun. 18, 2015

Related U.S. Application Data

(60) Provisional application No. 61/917,271, filed on Dec. 17, 2013.

(51) Int. Cl.
| | |
|---|---|
| *G01L 1/04* | (2006.01) |
| *G01L 7/04* | (2006.01) |
| *G01L 1/14* | (2006.01) |
| *G01L 1/18* | (2006.01) |
| G01L 1/22 | (2006.01) |
| G01L 7/18 | (2006.01) |

(52) U.S. Cl.
CPC ............... *G01L 7/041* (2013.01); *G01L 1/146* (2013.01); *G01L 1/18* (2013.01); *G01L 1/2206* (2013.01); *G01L 7/182* (2013.01)

(58) Field of Classification Search
CPC .......... G01L 1/04; G01L 1/20; G01L 1/205; G01L 1/246; G01L 1/2206
USPC ..................... 73/780, 862.625, 862.626, 760
See application file for complete search history.

(56) References Cited

U.S. PATENT DOCUMENTS

| | | | | |
|---|---|---|---|---|
| 4,141,055 | A | * | 2/1979 | Berry .................. H01L 23/5381 174/253 |
| 4,314,227 | A | | 2/1982 | Eventoff |
| 4,426,884 | A | * | 1/1984 | Polchaninoff ........ A61B 5/1036 338/114 |

(Continued)

OTHER PUBLICATIONS

Gao, Qiang, et al. "Flexible tactile sensor using the reversible deformation of poly (3-hexylthiophene) nanofiber assemblies." Langmuir 28.51 (2012): 17593-17596.

(Continued)

*Primary Examiner* — Max Noori
(74) *Attorney, Agent, or Firm* — Crawford Maunu PLLC (57) ABSTRACT

Various aspects of the instant disclosure relate to pressure sensing methods and apparatuses. As may be implemented in accordance with one or more embodiments, an apparatus includes a plurality of structures having respective surface areas that are implemented to contact at least one of an electrode and other ones of the structures. The structures operate with the electrode to provide an electrical indication of pressure by effecting a change in the respective surface areas in response to an elastic compression or expansion of the structures, and providing a change in electrical impedance between the structures and the electrode based on the change in the respective surface areas.

20 Claims, 3 Drawing Sheets

(56) References Cited

U.S. PATENT DOCUMENTS

| | | | |
|---|---|---|---|
| 4,503,705 A * | 3/1985 | Polchaninoff | G01L 1/20 |
| | | | 338/114 |
| 4,852,443 A * | 8/1989 | Duncan | G10H 1/0551 |
| | | | 200/600 |
| 5,302,936 A | 4/1994 | Yaniger | |
| 5,989,700 A | 11/1999 | Krivopal | |
| 6,589,629 B1 | 7/2003 | Bao et al. | |
| 7,137,291 B2 | 11/2006 | Mancevski | |
| 7,178,405 B2 * | 2/2007 | Sato | G01L 1/205 |
| | | | 73/818 |
| 7,589,439 B2 * | 9/2009 | Raisanen | H04R 19/016 |
| | | | 307/400 |
| 7,785,704 B2 | 8/2010 | Papakostas et al. | |
| 8,020,456 B2 | 9/2011 | Liu et al. | |
| 8,161,826 B1 | 4/2012 | Taylor | |
| 8,764,668 B2 | 7/2014 | Roteliuk et al. | |
| 8,764,670 B2 | 7/2014 | Sawanoi et al. | |
| 2003/0030452 A1 * | 2/2003 | Okada | G01L 1/142 |
| | | | 324/681 |
| 2006/0260417 A1 | 11/2006 | Son et al. | |
| 2011/0034328 A1 | 2/2011 | Kang et al. | |
| 2011/0108936 A1 | 5/2011 | Meng et al. | |
| 2011/0192233 A1 | 8/2011 | Aizenberg et al. | |
| 2012/0062245 A1 | 3/2012 | Bao et al. | |
| 2012/0177934 A1 | 7/2012 | Vogel et al. | |
| 2012/0301607 A1 | 11/2012 | Kabir et al. | |

OTHER PUBLICATIONS

Maheshwari, Vivek, and Ravi F. Saraf. "High-resolution thin-film device to sense texture by touch." Science 312.5779 (2006): 1501-1504.

Segev-Bar, Meital, et al. "Tunable touch sensor and combined sensing platform: toward nanoparticle-based electronic skin." ACS applied materials & interfaces 5.12 (2013): 5531-5541. Abstract Only.

Yao, Hong-Bin, et al. "A flexible and highly pressure-sensitive graphene-polyurethane sponge based on fractured microstructure design." Advanced Materials 25.46 (2013): 6692-6698. Abstract Only.

Liu, Xinchuan, et al. "A highly sensitive pressure sensor using a Au-patterned polydimethylsiloxane membrane for biosensing applications." Journal of Micromechanics and Microengineering 23.2 (2013): 025022.

Choong, Chwee-Lin, et al. "Highly stretchable resistive pressure sensors using a conductive elastomeric composite on a micropyramid array." Advanced Materials 26.21 (2014): 3451-3458.

Cai, Le, et al. "Super-stretchable, transparent carbon nanotube-based capacitive strain sensors for human motion detection." Scientific reports 3 (2013).

Lin, Lin, et al. "Towards tunable sensitivity of electrical property to strain for conductive polymer composites based on thermoplastic elastomer." ACS applied materials & interfaces 5.12 (2013): 5815-5824. Abstract Only.

Cohen, Daniel J., et al. "A highly elastic, capacitive strain gauge based on percolating nanotube networks." Nano letters 12.4 (2012): 1821-1825. Abstract Only.

Matsuzaki, Ryosuke, et al. "Rubber-based strain sensor fabricated using photolithography for intelligent tires." Sensors and Actuators A: Physical 148.1 (2008): 1-9.

Xiao, Xu, et al. "High-Strain Sensors Based on ZnO Nanowire/Polystyrene Hybridized Flexible Films." Advanced Materials 23.45 (2011): 5440-5444.

Cha, Seung Nam, et al. "Sound-Driven Piezoelectric Nanowire-Based Nanogenerators." Advanced materials 22.42 (2010): 4726-4730.

Wang, Xudong, et al. "Direct-current nanogenerator driven by ultrasonic waves." Science 316.5821 (2007): 102-105.

Wang, Zhong Lin, and Jinhui Song. "Piezoelectric nanogenerators based on zinc oxide nanowire arrays." Science 312.5771 (2006): 242-246.

Kim, Hyunjin, et al. "Enhancement of piezoelectricity via electrostatic effects on a textile platform." Energy & Environmental Science 5.10 (2012): 8932-8936. Abstract Only.

Xu, Sheng, et al. "Self-powered nanowire devices." Nature nanotechnology 5.5 (2010): 366-373.

Chang, Chieh, et al. "Direct-write piezoelectric polymeric nanogenerator with high energy conversion efficiency." Nano letters 10.2 (2010): 726-731.

Cha, SeungNam, et al. "Porous PVDF as effective sonic wave driven nanogenerators." Nano letters 11.12 (2011): 5142-5147.

Chang, Jiyoung, et al. "Piezoelectric nanofibers for energy scavenging applications." Nano Energy 1.3 (2012): 356-371.

Lee, Ju-Hyuck, et al. "Highly Stretchable Piezoelectric-Pyroelectric Hybrid Nanogenerator." Advanced Materials 26.5 (2014): 765-769.

Park, Kwi-Il, et al. "Flexible nanocomposite generator made of BaTiO3 nanoparticles and graphitic carbons." Advanced Materials 24.22 (2012): 2999-3004.

Wu, Wenzhuo, Xiaonan Wen, and Zhong Lin Wang. "Taxel-addressable matrix of vertical-nanowire piezotronic transistors for active and adaptive tactile imaging." Science 340.6135 (2013): 952-957.

Fan, Feng-Ru, et al. "Transparent triboelectric nanogenerators and self-powered pressure sensors based on micropatterned plastic films." Nano letters 12.6 (2012): 3109-3114.

Lin, Long, et al. "Triboelectric active sensor array for self-powered static and dynamic pressure detection and tactile imaging." ACS nano 7.9 (2013): 8266-8274.

Lin, Zong-Hong, et al. "Enhanced Triboelectric Nanogenerators and Triboelectric Nanosensor Using Chemically Modified TiO2 Nanomaterials." ACS nano 7.5 (2013): 4554-4560.

Yang, Ya, et al. "Human skin based triboelectric nanogenerators for harvesting biomechanical energy and as self-powered active tactile sensor system." ACS nano 7.10 (2013): 9213-9222.

Yang, Ya, et al. "Electret Film-Enhanced Triboelectric Nanogenerator Matrix for Self-Powered Instantaneous Tactile Imaging." ACS applied materials & interfaces 6.5 (2014): 3680-3688.

Sekitani, Tsuyoshi, and Takao Someya. "Stretchable, Large-area Organic Electronics." Advanced Materials 22.20 (2010): 2228-2246. Abstract Only.

Rogers, John A., Takao Someya, and Yonggang Huang. "Materials and mechanics for stretchable electronics." Science 327.5973 (2010): 1603-1607.

Mi, Yongli, et al. "Micromolding of PDMS scaffolds and microwells for tissue culture and cell patterning: A new method of microfabrication by the self-assembled micropatterns of diblock copolymer micelles." Polymer 47.14 (2006): 5124-5130.

Balaban, Nathalie Q., et al. "Force and focal adhesion assembly: a close relationship studied using elastic micropatterned substrates." Nature cell biology 3.5 (2001): 466-472.

Sekitani, Tsuyoshi, et al. "A rubberlike stretchable active matrix using elastic conductors." Science 321.5895 (2008): 1468-1472. Abstract Only.

Wang, Sihong, Long Lin, and Zhong Lin Wang. "Nanoscale triboelectric-effect-enabled energy conversion for sustainably powering portable electronics." Nano letters 12.12 (2012): 6339-6346.

Hu, Youfan, et al. "Triboelectric nanogenerator built on suspended 3D spiral structure as vibration and positioning sensor and wave energy harvester." ACS nano 7.11 (2013): 10424-10432.

Yang, Jin, et al. "Triboelectrification-based organic film nanogenerator for acoustic energy harvesting and self-powered active acoustic sensing." ACS nano 8.3 (2014): 2649-2657.

Zhu, Guang, et al. "Toward large-scale energy harvesting by a nanoparticle-enhanced triboelectric nanogenerator." Nano letters 13.2 (2013): 847-853.

Bai, Peng, et al. "Integrated multilayered triboelectric nanogenerator for harvesting biomechanical energy from human motions." Acs Nano 7.4 (2013): 3713-3719.

Zhong, Junwen, et al. "Finger typing driven triboelectric nanogenerator and its use for instantaneously lighting up LEDs." Nano Energy 2.4 (2013): 491-497. Abstract Only.

Zhang, Xiao-Sheng, et al. "Frequency-multiplication high-output triboelectric nanogenerator for sustainably powering biomedical microsystems." Nano letters 13.3 (2013): 1168-1172. Abstract Only.

(56) References Cited

OTHER PUBLICATIONS

Wang, Sihong, et al. "Freestanding Triboelectric-Layer-Based Nanogenerators for Harvesting Energy from a Moving Object or Human Motion in Contact and Non-contact Modes." Advanced Materials 26.18 (2014): 2818-2824.
Cheng, Gang, et al. "Increase Output Energy and Operation Frequency of a Triboelectric Nanogenerator by Two Grounded Electrodes Approach." Advanced Functional Materials 24.19 (2014): 2892-2898.
Lin, Long, et al. "Segmentally structured disk triboelectric nanogenerator for harvesting rotational mechanical energy." Nano letters 13.6 (2013): 2916-2923.
Wang, Zhong Lin. "Triboelectric nanogenerators as new energy technology for self-powered systems and as active mechanical and chemical sensors." ACS nano 7.11 (2013): 9533-9557.
Wang, Sihong, et al. "Sliding-triboelectric nanogenerators based on in-plane charge-separation mechanism." Nano letters 13.5 (2013): 2226-2233.
Ishikawa, Fumiaki N., et al. "Transparent electronics based on transfer printed aligned carbon nanotubes on rigid and flexible substrates." ACS nano 3.1 (2008): 73-79.
Surapaneni, R., et al. "A three-axis high-resolution capacitive tactile imager system based on floating comb electrodes." Journal of Micromechanics and Microengineering 23.7 (2013): 075004. Abstract Only.
Liao, K. W., Max T. Hou, and J. Andrew Yeh. "A dielectiric liquid-based capcitive tactile sensor for normal and shear force sensing." Solid-State Sensors, Actuators and Microsystems (Transducers & Eurosensors XXVII), 2013 Transducers & Eurosensors XXVII: The 17th International Conference on. IEEE, 2013. Abstract Only.
Dobrzynska, Jagoda Anna, and M. A. M. Gijs. "Polymer-based flexible capacitive sensor for three-axial force measurements." Journal of Micromechanics and Microengineering 23.1 (2013): 015009. Abstract Only.
Lee, Hyung-Kew, et al. "Real-time measurement of the three-axis contact force distribution using a flexible capacitive polymer tactile sensor." Journal of Micromechanics and Microengineering 21.3 (2011): 035010.
Deepu, Chacko John, et al. "An ECG-on-chip for wearable cardiac monitoring devices." Electronic Design, Test and Application, 2010. DELTA'10. Fifth IEEE International Symposium on. IEEE, 2010.
Greenwood, J. A. Constriction resistance and the real area of contact. Br. J. Appl. Phys. 17, 1621-1632 (1966).
Lau, Y. Y. & Tang, W. A higher dimensional theory of electrical contact resistance. J. Appl. Phys. 105, 124902 (2009). Abstract Only.
Gomez, M. R. et al. Experimental validation of a higher dimensional theory of electrical contact resistance. Appl. Phys. Lett. 95, 072103 (2009).
Zhang, P. & Lau, Y. Y. Scaling laws for electrical contact resistance with dissimilar materials. J. Appl. Phys. 108, 044914 (2010).
Zhang, P., Lau, Y. Y. & Gilgenbach, R. M. Thin film contact resistance with dissimilar materials. J. Appl. Phys. 109, 124910 (2011).
Lam, Y. Z., Swingler, J. & McBride, J. W. The contact resistance force relationship of an intrinsically conducting polymer interface. IEEE Trans. Comp. Pack. Tech. 29, 294-302 (2006).
Liu, W., Menciassi, A., Scapellato, S., Dario, P. & Chen, Y. A biomimetic sensor for a crawling minirobot. Robot. Auton. Syst. 54, 513-528 (2006).
Oh, K. W., Park, H. J. & Kim, S. H. Electrical property and stability of electrochemically synthesized polypyrrole films. J. Appl. Polym. Sci. 91, 3659-3666 (2004).
Li, Y. et al. A flexible strain sensor from polypyrrole-coated fabrics. Synthetic Met. 155, 89-94 (2005). Abstract Only.
Jiang, M. J., Dang, Z. M. & Xu, H. P. Significant temperature and pressure sensitivities of electrical properties in chemically modified multiwall carbon nanotube/methylvinyl silicone rubber nanocomposites. Appl. Phys. Lett. 89, 182902 (2006). Abstract Only.
de la Vega, A., Sumfleth, J., Wittich, H. & Schulte, K. Time and temperature dependent piezoresistance of carbon nanofiller/polymer composites under dynamic load. J. Mater. Sci. 47, 2648-2657 (2012). Abstract Only.
Wu, J., Zhou, D., Too, C. O. &Wallace, G. G. Conducting polymer coated lycra. Synthetic Met. 155, 698-701 (2005). Abstract Only.
Ochoteco, E. et al. All-plastic distributed pressure sensors: taylor-made performance by electroactive materials design. Microsyst. Technol. 14, 1089-1097 (2008) Abstract Only.
Papakostas, Thomas V., Julian Lima, and Mark Lowe. "A large area force sensor for smart skin applications." Sensors, 2002. Proceedings of IEEE. vol. 2. IEEE, 2002.
King, M. G., et al. "Porous PDMS force sensitive resistors." Procedia Chemistry 1.1 (2009): 568-571.
Rizvi, Reza, and Hani Naguib. "Porosity and composition dependence on electrical and piezoresistive properties of thermoplastic polyurethane nanocomposites." Journal of Materials Research 28.17 (2013): 2415-2425.
Weiβ, Karsten, and Heinz Wörn. "The working principle of resistive tactile sensor cells." Mechatronics and Automation, 2005 IEEE International Conference. vol. 1. IEEE, 2005.
Kuang, Jun, et al. "A hierarchically structured graphene foam and its potential as a large-scale strain-gauge sensor." Nanoscale 5.24 (2013): 12171-12177.
Yu, Z. B., Niu, X. F., Liu, Z. & Pei, Q. B. "Intrinsically stretchable polymer light-emitting devices using carbon nanotube-polymer composite electrodes", Adv. Mater. 23, 3989-3994 (2011). Abstract Only.
Ilievski, F., Mazzeo, A. D., Shepherd, R. F., Chen, X. & Whitesides, G. M. "Soft robotics for chemists". Angew. Chem. Int. Ed. 50, 1890-1895 (2011).
Zhu and Xu "Buckling of Aligned Carbon Nanotubes as Stretchable Conductors: A New Manufacturing Strategy"; Adv. Mater. 2012, 24, 1073-1077.
Xu et al. "Wavy Ribbons of Carbon Nanotubes for Stretchable Conductors" Adv. Funct. Mater. 2012.
Akter et al. "Reversibly Stretchable Transparent Conductive Coatings of Spray-Deposited Silver Nanowires"; ACS Appl. Mater. Interfaces, 2012, 4 (4), pp. 1855-1859. Abstract Only.
Xu et al., "Highly Conductive and Stretchable Silver Nanowire Conductors"; Adv. Mater. 2012, 24, 5117-5122.
Kim et al., "Single-walled carbon nanotube/silicone rubber composites for compliant electrodes", SciVerse ScienceDirect, 2011.
Bergeron, "Stanford researchers build transparent, super-stretchy skin-like sensor", http://new.stanford.edu/pr/2011/pr-stretchy-skin-like-sensor-102411.html on Dec. 1, 2011.
Kendall, K. "Thin-film peeling-the elastic term." Journal of Physics D: Applied Physics 8.13 (1975): 1449-1452.
Kaltenbrunner, Martin, et al. "An ultra-lightweight design for imperceptible plastic electronics." Nature 499.7459 (2013): 458-463.
Webb, R. Chad, et al. "Ultrathin conformal devices for precise and continuous thermal characterization of human skin." (2013).
Salvatore, Giovanni A., et al. "Wafer-scale design of lightweight and transparent electronics that wraps around hairs." Nature communications 5 (2014). Abstract Only.
Lee, Sangmin, et al. "Ultrathin Nanogenerators as Self-Powered/Active Skin Sensors for Tracking Eye Ball Motion." Adv. Funct. Mater 24 (2014): 1163-1168.
Hammock, Mallory L., et al. "25th Anniversary Article: The Evolution of Electronic Skin (E-Skin): A Brief History, Design Considerations, and Recent Progress." Advanced Materials 25.42 (2013): 5997-6038.
Wang, Chuan, et al. "User-interactive electronic skin for instantaneous pressure visualization." Nature materials 12.10 (2013): 899-904.
Kwak, Moon Kyu, Hoon-Eui Jeong, and Kahp Y. Suh. "Rational design and enhanced biocompatibility of a dry adhesive medical skin patch." Advanced Materials 23.34 (2011): 3949-3953.

(56) References Cited

OTHER PUBLICATIONS

Yang, Seung Yun, et al. "A bio-inspired swellable microneedle adhesive for mechanical interlocking with tissue." Nature 4 (1702): 2013.
Burrows, Malcolm, and Gregory Sutton. "Interacting gears synchronize propulsive leg movements in a jumping insect." science 341.6151 (2013): 1254-1256.
Casas, J., Steinmann, T. & Krijnen, G. Why do insects have such a high density of flow-sensing hairs? Insights from the hydromechanics of biomimetic MEMS sensors. J. R. Soc. Interface. 7, 1487-1495 (2010).
Pang, Changhyun, et al. "Bioinspired Reversible Interlocker Using Regularly Arrayed High Aspect-Ratio Polymer Fibers." Advanced Materials 24.4 (2012): 475-479. Abstract Only.
Lagarde, Marcia M. Mellado, et al. "Outer hair cell somatic, not hair bundle, motility is the basis of the cochlear amplifier." Nature neuroscience 11.7 (2008): 746-748.
Bélanger, M. and Marois, Y. (2001), Hemocompatibility, biocompatibility, inflammatory and in vivo studies of primary reference materials low-density polyethylene and polydimethylsiloxane: A review. J. Biomed. Mater. Res., 58: 467-477. doi: 10.1002/jbm.1043 Abstract Only.
Mittal, S. R., Sandeep Garg, and Mahesh Lalgarhia. "Jugular venous pressure and pulse wave form in the diagnosis of right ventricular infarction." International journal of cardiology 53.3 (1996): 253-256. Abstract.
Haji, Showkat A., and Assad Movahed. "Right ventricular infarction—diagnosis and treatment." Clinical cardiology 23.7 (2000): 473-482.
Devine, Patrick J., et al. "Jugular venous pulse: window into the right heart." Southern medical journal 100.10 (2007): 1022-7. Abstract Only.
Pang et al., "A flexible and highly sensitive strain-gauge sensor using reversible interlocking of nanofibres." (2012).
Pang, Changhyun, et al. "Analysis of preload-dependent reversible mechanical interlocking using beetle-inspired wing locking device." Langmuir 28.4 (2011): 2181-2186. Abstract Only.
Waddell, Tamara K., et al. "Carotid pressure is a better predictor of coronary artery disease severity than brachial pressure." Hypertension 38.4 (2001): 927-931.
Pauca, Aifredo L., et al. "Does radial artery pressure accurately reflect aortic pressure'?." CHEST Journal 102.4 (1992): 1193-1198.
Ewy GA. The Abdominojugular Test: Technique and Hemodynamic Correlates. Ann Intern Med. 1988;109:456-460. doi:10.7326/0003-4819-109-6-456.
Eberlein B., et al. "Skin surface pH, stratum corneum hydration, trans-epidermal water loss and skin roughness related to atopic eczema and skin dryness in a population of primary school children: clinical report." Acta Dermatology-Venerology 80 (2000): 188-191.
Lee, Jessamine Ng, et al. "Compatibility of mammalian cells on surfaces of poly (dimethylsiloxane)." Langmuir 20.26 (2004): 11684-11691.
Craig, R. R. Mechanics of materials. (Wiley, 2011). Book Description and Table of Content Provided.
Conover, M. B. Understanding electrocardiography. (Mosby, 2002). Book Overview Provided.
Tafur, Emilio, Lawrence S. Cohen, and Harold D. Levine. "The Normal Apex Cardiogram Its Temporal Relationship to Electrical, Acoustic, and Mechanical Cardiac Events." Circulation 30.3 (1964): 381-391.
Pittman, James AL, John Sum Ping, and Jonathan B. Mark. "Arterial and central venous pressure monitoring." International anesthesiology clinics 42.1 (2004): 13-30.
Mannsfeld et al. "Highly sensitive flexible pressure sensors with microstructured rubber dielectric layers." (2010).
Tee, Benjamin C-K., et al. "Tunable Flexible Pressure Sensors using Microstructured Elastomer Geometries for Intuitive Electronics." Advanced Functional Materials 24.34 (2014): 5427-5434.
Park, S., et al. "Stretchable energy-harvesting tactile electronic skin capable of differentiating multiple mechanical stimuli modes." Advanced materials (Deerfield Beach, Fla.) 26.43 (2014): 7324-7332. Abstract Only.
Wang, Xuewen, et al. "Silk—Molded Flexible, Ultrasensitive, and Highly Stable Electronic Skin for Monitoring Human Physiological Signals." Advanced Materials 26.9 (2014): 1336-1342.
Ko H., et al.,"Multifunctional, flexible electronic systems based on engineered nanostructured materials," Nanotechnology 23 (2012).
Dahiya, Ravinder S., et al. "Tactile sensing—from humans to humanoids." Robotics, IEEE Transactions on 26.1 (2010): 1-20.
Pang, Changhyun, Chanseok Lee, and Kahp-Yang Suh. "Recent advances in flexible sensors for wearable and implantable devices." Journal of Applied Polymer Science 130.3 (2013): 1429-1441.
Takahashi, Toshitake, et al. "Carbon nanotube active-matrix backplanes for conformal electronics and sensors." Nano letters 11.12 (2011): 5408-5413.
Lee, Hyung-Kew, Sun-Il Chang, and Euisik Yoon. "A flexible polymer tactile sensor: Fabrication and modular expandability for large area deployment." Microelectromechanical Systems, Journal of 15.6 (2006): 1681-1686.
Cheng, M. Y., et al. "A flexible capacitive tactile sensing array with floating electrodes." Journal of Micromechanics and Microengineering 19.11 (2009): 115001.
Gong, Shu, et al. "A wearable and highly sensitive pressure sensor with ultrathin gold nanowires." Nature communications 5 (2014). Abstract Only.
Pan, Lijia, et al. "An ultra-sensitive resistive pressure sensor based on hollow-sphere microstructure induced elasticity in conducting polymer film." Nature communications 5 (2014).
Jackman, R. J., Duffy, D. C., Cherniavskaya, O. & Whitesides, G. M. "Using elastomeric membranes as dry resists and for dry lift-off". Langmuir 15, 2973-2984 (1999).
Tombler, T.W., et al. "Reversible electromechanical characteristics of carbon nanotubes under local-probe manipulation". Nature 405, 769-772 (2000).
Jones, J., Lacour, S. P., Wagner, S. & Suo, Z. G. "Stretchable wavy metal interconnects". J. Vac. Sci. Technol. A 22, 1723-1725 (2004).
Bekyarova, E. et al. "Electronic properties of single-walled carbon nanotube networks". J. Am. Chem. Soc 127, 5990-5995 (2005). Abstract Only.
Someya, T. et al. "Conformable, flexible, large-area networks of pressure and thermal sensors with organic transistor active matrixes". Proc. Natl Acad. Sci. USA 102, 12321-12325 (2005).
Nosho, Y., Ohno, Y., Kishimoto, S. & Mizutani, T. "The effects of chemical doping with F(4)TCNQ in carbon nanotube field-effect transistors studied by the transmission-line-model technique". Nanotechnology 18, 415202 (2007).
Khang, D. Y. et al. "Molecular scale buckling mechanics in individual aligned single-wall carbon nanotubes on elastomeric substrates". Nano Lett. 8, 124-130 (2008).
LeMieux, M. C. & Bao, Z. N. "Flexible electronics: stretching our imagination". Nature Nanotech. 3, 585-586 (2008). Abstract Only.
Dickey, M. D. et al. "Eutectic gallium—indium (EGaIn): a liquid metal alloy for the formation of stable structures in microchannels at room temperature". Adv. Funct. Mater. 18, 1097-1104 (2008).
Ko, H. C. et al. "A hemispherical electronic eye camera based on compressible silicon optoelectronics". Nature 454, 748-753 (2008).
Cotton, D. P. J., Graz, I. M. & Lacour, S. P. "A multifunctional capacitive sensor for stretchable electronic skins". IEEE Sens. J. 9, 2008-2009 (2009).
Sekitani, T. et al. "Stretchable active-matrix organic light-emitting diode display using printable elastic conductors". Nature Mater. 8, 494-499 (2009).
Graz, I. M., Cotton, D. P. J. & Lacour, S. P. "Extended cyclic uniaxial loading of stretchable gold thin-films on elastomeric substrates". Appl. Phys. Lett. 98, 071902 (2009). Abstract Only.
Tahk, D., Lee, H. H. & Khang, D. Y. "Elastic moduli of organic electronic materials by the buckling method". Macromolecules 42, 7079-7083 (2009). Abstract Only.
Kim, K. S. et al. "Large-scale pattern growth of graphene films for stretchable transparent electrodes". Nature 457, 706-710 (2009).

(56) References Cited

OTHER PUBLICATIONS

Avouris, P. "Carbon nanotube electronics and photonics". Phys. Today 62, 34-40 (2009).
Hu, L. B., Yuan, W., Brochu, P., Gruner, G. & Pei, Q. B. "Highly stretchable, conductive, and transparent nanotube thin films". Appl. Phys. Lett. 94, 161108 (2009). Abstract Only.
Yu, C. J., Masarapu, C., Rong, J. P., Wei, B. Q. & Jiang, H. Q. "Stretchable supercapacitors based on buckled single-walled carbon nanotube macrofilms", Adv. Mater. 21, 4793-4797 (2009).
Cao, Q. & Rogers, J. A. "Ultrathin films of single-walled carbon nanotubes for electronics and sensors: a review of fundamental and applied aspects". Adv. Mater. 21, 29-53 (2009).
So, J. H. et al. "Reversibly deformable and mechanically tunable fluidic antennas", Adv. Funct. Mater. 19, 3632-3637 (2009).
Roberts, M. E., Sokolov, A. N. & Bao, Z. N. "Material and device considerations for organic thin-film transistor sensors". J. Mater. Chem. 19, 3351-3363 (2009). Abstract Only.
Bae, S. et al. "Roll-to-roll production of 30-inch graphene films for transparent electrodes", Nature Nanotech. 5, 574-578 (2010).
Feng, C. et al. "Flexible, stretchable, transparent conducting films made from superaligned carbon nanotubes". Adv. Funct. Mater. 20, 885-891 (2010). Abstract Only.
Kim, B. Y. S., Rutka, J. T. & Chan, W. C. W. "Current concepts: nanomedicine". New Engl. J. Med. 363, 2434-2443 (2010).
Kim, D. H. et al. "Dissolvable films of silk fibroin for ultrathin conformal biointegrated electronics". Nature Mater. 9, 511-517 (2010).
Kim, R. H. et al. "Waterproof AlInGaP optoelectronics on stretchable substrates with applications in biomedicine and robotics". Nature Mater. 9, 929-937 (2010). Abstract Only.
Viventi, J. et al. "A conformal, bio-interfaced class of silicon electronics for mapping cardiac electrophysiology". Sci. Transl. Med. 2, 24ra22 (2010).
Zhang, Y. Y. et al. "Polymer-embedded carbon nanotube ribbons for stretchable conductors". Adv. Mater. 22, 3027-3031 (2010).
Hu, L. B., Hecht, D. S. & Gruner, G. "Carbon nanotube thin films: fabrication, properties, and applications". Chem. Rev. 110, 5790-5844 (2010). Book Table of Contents Only.
Kubo, M. et al. "Stretchable microfluidic radiofrequency antennas". Adv. Mater. 22, 2749-2752 (2010).
Chun, K. Y. et al. "Highly conductive, printable and stretchable composite films of carbon nanotubes and silver". Nature Nanotech. 5, 853-857 (2010).
Lipomi, D. J., Tee, B. C.-K., Vosgueritchian, M. & Bao, Z. N. "Stretchable organic solar cells". Adv. Mater. 23, 1771-1775 (2011). Abstract Only.
Pantelopoulos, Alexandros, and Nikolaos G. Bourbakis. "A survey on wearable sensor-based systems for health monitoring and prognosis." Systems, Man, and Cybernetics, Part C: Applications and Reviews, IEEE Transactions on 40.1 (2010): 1-12.
Zhang, Da Ren, et al. "A wireless ECG plaster for real-time cardiac health monitoring in body sensor networks." Biomedical Circuits and Systems Conference (BioCAS), 2011 IEEE. IEEE, 2011.
Zhu, Guang, et al. "Triboelectric-generator-driven pulse electrodeposition for micropatterning." Nano letters 12.9 (2012): 4960-4965.
Que, Ronghui, et al. "Flexible nanogenerators based on graphene oxide films for acoustic energy harvesting." Angewandte Chemie 124.22 (2012): 5514-5518. Abstract Only.
Hinchet, Ronan, et al. "Performance Optimization of Vertical Nanowire-based Piezoelectric Nanogenerators." Advanced Functional Materials 24.7 (2014): 971-977.
Lee, Keun Young, et al. "P-Type polymer-hybridized high-performance piezoelectric nanogenerators." Nano letters 12.4 (2012): 1959-1964.
Yu, Zhibin, et al. "Highly Flexible Silver Nanowire Electrodes for Shape—Memory Polymer Light-Emitting Diodes." Advanced Materials 23.5 (2011): 664-668. Abstract Only.
Xu, Feng, and Yong Zhu. "Highly conductive and stretchable silver nanowire conductors." Advanced Materials 24.37 (2012): 5117-5122.
Park, Minwoo, et al. "Highly stretchable electric circuits from a composite material of silver nanoparticles and elastomeric fibres." Nature nanotechnology 7.12 (2012): 803-809. Abstract Only.
Feng, Xue, et al. "Stretchable ferroelectric nanoribbons with wavy configurations on elastomeric substrates." Acs Nano 5.4 (2011): 3326-3332.
Lekkala, J. et al. "EMF force sensor—a flexible and sensitive electret film for physiological applications." Medical and Biological Engineering and Computing 34 (1996): 67-68.
Bauer, Siegfried, Reimund Gerhard-Multhaupt, and Gerhard M. Sessler. "Ferroelectrets: Soft electroactive foams for transducers." Physics Today 57.2 (2004): 37-43. Abstract Only.
Zhang, Xiaoqing, et al. "Piezoelectric properties of irradiation-crosslinked polypropylene ferroelectrets." Applied Physics Letters 91.18 (2007): 2901. Abstract Only.
Zhang, Xiaoqing, et al. "Quasi-static and dynamic piezoelectric d33 coefficients of irradiation cross-linked polypropylene ferroelectrets." Journal of materials science 44.10 (2009): 2459-2465. Abstract Only.
Zhang, X., et al. "Piezoelectric coefficients of cross-linked polypropylene films stretched at elevated temperatures." Journal of Electrostatics 69.6 (2011): 554-558. Abstract Only.
Wegener, M., et al. "Controlled inflation of voids in cellular polymer ferroelectrets: Optimizing electromechanical transducer properties." Applied Physics Letters 84.3 (2004): 392-394.
Hillenbrand, Joachim, Gerhard M. Sessler, and Xiaoqing Zhang. "Verification of a model for the piezoelectric d33 coefficient of cellular electret films." Journal of applied physics 98.6 (2005): 4105. Abstract Only.
Ver der Vegt, A. K. "From Polymers to Plastics." Dup Blue Print, Delft University Press, The Netherlands (2002): 16. Book.
Neugschwandtner, G. S., et al. "Large and broadband piezoelectricity in smart polymer-foam space-charge electrets." Applied Physics Letters 77.23 (2000): 3827-3829. Abstract Only.
Mellinger, Axel. "Dielectric resonance spectroscopy: a versatile tool in the quest for better piezoelectric polymers." Dielectrics and Electrical Insulation, IEEE Transactions on 10.5 (2003): 842-861. Abstract Only.
Kressmann, Reiner. "Linear and nonlinear piezoelectric response of charged cellular polypropylene." Journal of Applied Physics 90.7 (2001): 3489-3496. Abstract Only.
Hillenbrand, J., and G. M. Sessler. "Piezoelectricity in cellular electret films." Dielectrics and Electrical Insulation, IEEE Transactions on 7.4 (2000): 537-542. Abstract Only.
Sessler, G. M., and J. Hillenbrand. "Electromechanical response of cellular electret films." Applied Physics Letters 75.21 (1999): 3405-3407. Abstract Only.
Qi, Yi, et al. "Enhanced piezoelectricity and stretchability in energy harvesting devices fabricated from buckled PZT ribbons." Nano letters 11.3 (2011): 1331-1336.
Ko, Hyunhyub, et al. "Multifunctional, flexible electronic systems based on engineered nanostructured materials." Nanotechnology 23.34 (2012): 344001.
Oaki Y. Kijima, M., Imai, H. Synthesis and Morphogenesis of Organic Polymer Materials with Hierarchical Structures in Biominerals. J. Am. Chem. Soc.133, 8594-8599 (2011). Abstract Only.
Hillis, W. D. A high-resolution imaging touch sensor. Int. J. Robot. Res.1, 33-44 (1982). Abstract Only.
Barnoss, S., et al. Piezoresistance in chemically synthesized polypyrrole thin films. Sensor. Actuat. A-Phys.154, 79-84 (2009).
Scilingo, E. P., et al. Strain-sensing fabrics for wearable kinaesthetic-like systems. IEEE Sensor. J.3, 460-467 (2003).
Wu, J., et al. Conducting polymer coated lycra. Synth. Met.155, 698-701 (2005). Abstract Only.
Kim, D. H. et al. Epidermal Electronics. Science 333, 838-843 (2011).
Sokolov, A. N., Tee, B. C. K., Bettinger, C. J., Tok, J. B. H. & Bao, Z. Chemical and engineering approaches to enable organic field-

(56) References Cited

OTHER PUBLICATIONS effect transistors for electronic skin applications. Acc. Chem. Res. 45, 361-371 (2012). Abstract Only.
Wagner, S. & Bauer, S. Materials for stretchable electronics. MRS Bull. 37, 207-217 (2012).
Lumelsky, V. J., Shur, M. S. & Wagner, S. Sensitive skin. IEEE Sens. J. 1, 41-51 (2001).
Someya, T. et al. A large-area, flexible pressure sensor matrix with organic fieldeffect transistors for artificial skin applications. Proc. Natl Acad. Sci. USA 101, 9966-9970 (2004).
Mannsfeld, S. C. B. et al. Highly sensitive flexible pressure sensors with microstructured rubber dielectric layers. Nat. Mater. 9, 859-864 (2010).
Takei, K. et al. Nanowire active-matrix circuitry for low-voltage macroscale artificial skin. Nat. Mater. 9, 821-826 (2010).
Hu, W. L., Niu, X. F., Zhao, R. & Pei, Q. B. Elastomeric transparent capacitive sensors based on an interpenetrating composite of silver nanowires and polyurethane. Appl. Phys. Lett. 102, 083303 (2013).
Schwartz, G. et al. Flexible polymer transistors with high pressure sensitivity for application in electronic skin and health monitoring. Nat. Commun. 4, 1859-1859 (2013). Abstract Only.
Jeon, J., Lee, H.-B.-R. & Bao, Z. Flexible wireless temperature sensors based on Ni microparticle-filled binary polymer composites. Adv. Mater. 25, 850-855 (2013). Abstract Only.
Feng, J. et al. Giant moisture responsiveness of VS2 ultrathin nanosheets for novel touchless positioning interface. Adv. Mater. 24, 1969-1974 (2012). Abstract Only.
Tian, B. et al. Three-dimensional, flexible nanoscale field-effect transistors as localized bioprobes. Science 329, 830-834 (2010).
Viventi, J. et al. Flexible, foldable, actively multiplexed, high-density electrode array for mapping brain activity in vivo. Nat. Neurosci. 14, 1599-1605 (2011).
Roberts, M. E. et al. Water-stable organic transistors and their application in chemical and biological sensors. Proc. Natl Acad. Sci. USA 105, 12134-12139 (2008).
Li, D. Huang, J. & Kaner, R. B. Polyaniline nanofibers: a unique polymer nanostructure for versatile applications. Acc. Chem. Res. 42, 135-145 (2009).
Yamada, T. et al. A stretchable carbon nanotube strain sensor for humanmotion detection. Nat. Nanotechn. 6, 296-301 (2011).
Lipomi, D. J. et al. Skin-like pressure and strain sensors based on transparent elastic films of carbon nanotubes. Nat. Nanotechn. 6, 788-792 (2011). Abstract Only.
Pang, C. et al. A flexible and highly sensitive strain-gauge sensor using reversible interlocking of nanofibres. Nat. Mater. 11, 795-801 (2012).
Maheshwari, V. & Saraf, R. Tactile devices to sense touch on a par with a human finger. Angew. Chem. Int. Edit. 47, 7808-7826 (2008). Abstract Only.
Tee, B. C. K., Wang, C., Allen, R. & Bao, Z. An electrically and mechanically self-healing composite with pressure- and flexion-sensitive properties for electronic skin applications. Nat. Nanotechn. 7, 825-832 (2012). Abstract Only.
Wang, L. & Li, Y. A review for conductive polymer piezoresistive composites and a development of a compliant pressure transducer. IEEE Trans. Instru. Measu. 62, 495-502 (2013).
Hatzivasiliou, F. V. & Tzafestas, S. G. Analysis and design of a new piezoresistive tactile sensor system for robotic applications. J. Intell. Robot. Syst. 10, 243-256 (1994).
Ferguson-Pell, M., Hagisawa, S. & Bain, D. Evaluation of a sensor for low interface pressure applications. Med. Eng. Phys. 22, 657-663 (2000). Abstract Only.

Rosenberg, I. & Perlin, K. The UnMousePad—an interpolating multi-touch force-sensing input pad. ACM Trans. Graph. 28, 65 (2009).
Shan, Z. W. et al. Ultrahigh stress and strain in hierarchically structured hollow nanoparticles. Nat. Mater. 7, 947-952 (2008).
Mahmoud, W. E., El-Eraki, M. H. I., El-Lawindy, A. M. Y. & Hassan, H. H. A novel application of ADC/K-foaming agent-loaded NBR rubber composites as pressure sensor. J. Phys. D-Appl. Phys. 39,541-546 (2006).
Brady, S., Diamond, D. & Lau, K. T. Inherently conducting polymer modified polyurethane smart foam for pressure sensing. Sensor Actuat. A-Phys. 119, 398-404 (2005).
Metzger, C. et al. Flexible-foam-based capacitive sensor arrays for object detection at low cost. Appl. Phys. Lett. 92, 013506 (2008).
Piepenbrock, M.-O. M., Lloyd, G. O., Clarke, N. & Steed, J. W. Metal- and anion-binding supramolecular gels. Chem. Rev. 110, 1960-2004 (2010). First Page Only.
Yulia Galagan et al. Technology development for roll-to-roll production of organic photovoltaics. Chem. Eng. Process 50, 454-461 (2011). Abstract Only.
Mark, J. Polymer Data Handbook. (Oxford Univ. Press, 1999).
Gibson, L. J. & Ashby, M. F. in Cellular Solids: Structure and Properties (Pergamon, 1997). Book.
Kim, K. H., Oh, Y. & Islam, M. F. Graphene coating makes carbon nanotube aerogels superelastic and resistant to fatigue. Nat. Nanotechn. 7, 562-566 (2012).
Hillis, W. D. A high-resolution imaging touch sensor. Int. J. Robot Res. 1, 33-44 (1982). Abstract Only.
Gorce, J. N., Hellgeth, J. W. & Ward, T. C. Mechanical hysteresis of a polyether polyurethane thermoplastic elastomer. Polym. Eng. Sci. 33, 1170-1176 (1993). Abstract Only.
Etchessahar, M. & Sahraoui, S. Frequency dependence of elastic properties of acoustic foams. J. Acoust. Soc. Am. 117, 1114-1121 (2005). Abstract Only.
Ahankari, S. S. & Kar, K. K. Hysteresis measurements and dynamic mechanical characterization of functionally graded natural rubber-carbon black composites. Polym. Eng. Sci. 50, 871-877 (2010). Abstract Only.
Shastry, V. V. Ramamurty, U. & Misra, A. Thermo-mechanical stability of a cellular assembly of carbon nanotubes in air. Carbon N. Y. 50, 4373-4378 (2012). Abstract Only.
Sanchez-Coronado, J. & Chung, D. D. L. Thermomechanical behavior of a graphite foam. Carbon N. Y. 41, 1175-1180 (2003).
Timsit, R. S. Electrical contact resistance: properties of stationary interfaces. IEEE Trans. Comp. Pack. Tech. 22, 85-98 (1999). Abstract Only.
Barnoss, S., Shanak, H., Bufon, C. C. B. & Heinzel, T. Piezoresistance in chemically synthesized polypyrrole thin films. Sensor Actuat. A-Phys. 154, 79-84 (2009).
Scilingo, E. P., Lorussi, F., Mazzoldi, A. & De Rossi, D. Strain-sensing fabrics for wearable kinaesthetic-like systems. IEEE Sensor. J. 3, 460-467 (2003).
Shobert, E. I. "Calculation of Electrical Contacts Under Ideal Conditions—Discussion." Proceedings—American Society for Testing and Materials. vol. 46. 100 Barr Harbor Dr, W Conshohocken, PA 19428-2959: Amer Soc Testing Materials, 1946.
Greenwood, J. A. & Williams, J. B. Contact of nominally flat surfaces. Proc. R. Soc. Lond. A 295, 300-319 (1966).
Archard, J. F. Elastic deformation and the laws of friction. Proc. R. Soc. Lond. A 243, 190-205 (1957).

* cited by examiner

SURFACE AREA-BASED PRESSURE SENSING

BACKGROUND

Pressure sensing can be useful for a variety of applications, and sensitivity and implementation of various sensors has continued to improve for a variety of applications. For example pressure sensors are used in a variety of industrial, automotive, and other applications, as well as in human interactive applications.

However, sensing pressure with desirable accuracy and flexibility of application has been challenging for existing approaches as well as for developing implementations in which pressure sensing is desired. For instance, the performance of certain devices can be limited by the bulk mechanical properties, which can result in poor sensitivity, slow response time, and poor temperature stability. Further, some sensors exhibit unstable contact under low pressure conditions. In addition, various sensors react adversely to changes in temperature. These and other matters have presented challenges to pressure sensing, for a variety of applications.

SUMMARY

Various example embodiments are directed to pressure sensors and their implementation, as well as approaches for manufacturing pressure sensors.

According to an example embodiment, an apparatus includes an electrode and a plurality of structures having respective surface areas that contact at least one of the electrode and other ones of the structures. The structures and electrode provide an electrical indication of pressure by effecting a change in the respective surface areas in response to an elastic compression or expansion of the structures. A change in electrical impedance between the structures and the electrode is based on the change in the respective surface areas, which is provided as an indication of the pressure.

Another embodiment is directed to a method as follows. An electrode and a plurality of structures are formed, in which the structures have respective surface areas that contact at least one of the electrode and other ones of the structures. The structures and electrode are formed to provide an electrical indication of pressure by effecting a change in the respective surface areas in response to an elastic deformation of the structures. A change in electrical impedance between the structures and the electrode is provided, based on the change in the respective surface areas.

Another embodiment is directed to a method of using an apparatus having an electrode and a plurality of structures, in which the structures have respective surface areas that contact at least one of the electrode and other ones of the structures. An electrical indication of pressure is provided by effecting a change in the respective surface areas in response to an elastic compression or expansion of the structures, and providing a change in electrical impedance between the structures and the electrode based on the change in the respective surface areas.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIGS. 3A-3D show an approach to manufacturing a structured film in accordance with another example embodiment, in which:

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving pressure sensing, based on contact impedance between structures. In certain implementations, aspects of the present disclosure involve the use of readily compressible or expandable structures, such as structures with cavities therein, that facilitate highly-sensitive responses to small changes in pressure. Various embodiments have been shown to be beneficial when used in the context of such pressure sensing, and specific applications such as with artificial skin, medical devices and highly-sensitive pressure applications. While not necessarily so limited, various aspects may be appreciated through a discussion of examples using this context.

Certain embodiments are directed to materials having a plurality of structures with respective surface contact areas (e.g., between the structures and an electrode), which provide a significant change in impedance characteristics relative to changes in the amount of surface area of the structures that contact. For instance, the structures operate to effect a change in the respective surface contact areas relative to one or more electrodes in response to an elastic compression or expansion, and therein provide a change in electrical impedance (e.g., conductivity) indicative of pressure. In various implementations, the structures define cavities that facilitate deformation, such as by defining a sphere or other shape that defines an enclosed cavity. Such embodiments may, for example, provide for a detectable change in conductivity that is based predominantly or nearly entirely upon deformation and changes in surface contact area that result from the application (or release) of pressure. Such detection may, for example, thus be provided independent from changes in dielectric function or elastic definition of the structures themselves.

Various embodiments are directed to pressure sensors having an electrode and a plurality of structures that have respective surface contact areas with each other and/or with the electrode. The structures effect a change in respective surface contact areas in response to an elastic compression or expansion of the structures, therein providing a change in electrical conductivity. The electrode couples the change in electrical conductivity, such as for providing an indication of the change for use in determining a pressure or change in pressure. In some implementations, the change in surface contact area is further facilitated via the use of such structures with a cavity or cavities therein, facilitating deformation of the structures and related changes in surface contact area.

Certain example embodiments are directed to pressure sensing as may be implemented in a variety of applications. One or more embodiments are directed to materials, sensors, methods of making such materials and/or sensors, and pressure sensing methods. Various such embodiments are described in Appendices A and B of U.S. Provisional Patent Application Ser. No. 61/917,271, which is fully incorporated herein by reference. Various example embodiments are thus directed to apparatuses, systems, methods of use, methods of making, or materials that address these challenges, such as those described in the claims, description or figures herein and in the Appendices filed as part of the underlying provisional application.

Another embodiment is directed to a method of using an apparatus having an electrode and a plurality of structures that have respective surface areas that contact at least one of the electrode and other ones of the structures. An electrical indication of pressure is provided by effecting a change in the respective surface areas in response to an elastic compression or expansion of the structures, and in response to the change in the respective surface areas, providing a change in electrical conductivity between the structures and the electrode. As with the above discussion, in some implementations the change in surface contact area is facilitated via the use of a cavity or cavities in the structures, facilitating deformation of the structures and related changes in surface contact area.

In accordance with one or more particular embodiments, an ultra-sensitive resistive pressure sensor is based on an elastic, microstructured conducting polymer (EMCP) thin film. In some implementations, the EMCP is prepared from a polypyrrole (PPy) hydrogel using a multi-phase reaction to produce a hollow-sphere microstructure that endows PPy with structure-derived elasticity and a low effective elastic modulus. The contact area between the EMCP and electrodes increases with the application of pressure, enabling the device to detect low pressures with ultra-high sensitivity (e.g., pressures of less than 1 Pa) and a short response time, good reproducibility, excellent cycling stability, and temperature-stable sensing. By forming relatively incompressible material into spheres, other shapes or wave-type structures, the resulting material can be deformed easily (e.g., 100% more than the bulk material used to form the structures). Combining such approaches with one or more electrodes renders material previously unusable as a pressure sensor, as a highly-responsive pressure sensor.

Figure 1A:
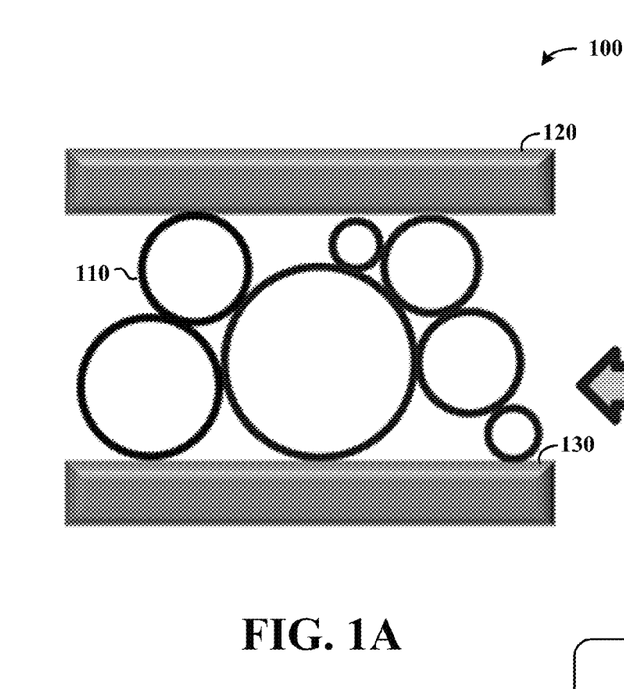
FIG. 1A shows a pressure-sensing apparatus in a state of compression, in accordance with an example embodiment.
Figure 1B:
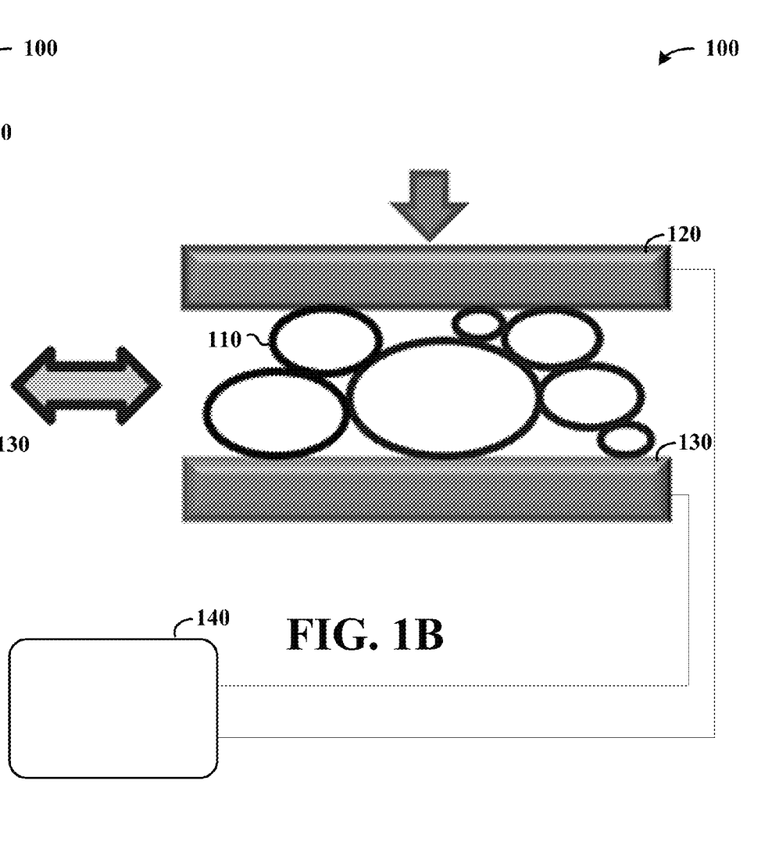
FIG. 1B shows the pressure-sensing apparatus of FIG. 1A in a different state of compression, in accordance with another example embodiment.

Particular embodiments are directed to a piezoresistive sensor in which the active layer is both conductive and elastic, which imparts ultra-high sensitivity and reproducible sensing characteristics. An EMCP includes interconnected hollow-sphere structures of PPy that are prepared through a multi-phase synthesis technique. While dense materials such as PPy may be stiff and brittle (e.g., due to rigid conjugated-ring backbone), it has been discovered that, by forming a spherical shell geometry or other geometries producing cavity-type regions, brittle nanostructured materials can be made to exhibit tunable effective elastic modulus that are capable of withstanding large effective strains and stresses. For instance, hollow-sphere structures including PPy may elastically deform and recover upon the application and release of external pressure (e.g., as shown in FIGS. 1A and 1B), promoting contact stability and facilitating stable and reproducible sensing performance.

Another embodiment is directed to an apparatus comprising an electrode and a plurality of structures having respective surface areas that contact at least one of the electrode and other ones of the structures. The structures operate with the electrode to provide an electrical indication of pressure by effecting a change in the respective surface areas in response to an elastic compression or expansion of the structures, and in response to the change in the respective surface areas, by providing a change in electrical conductivity between the structures and the electrode.

In some embodiments, at least some structures define cavities by forming sidewalls that enclose a cavity that has a volume and that compresses in response to an increase in pressure, and expands in response to a decrease in pressure. The cavities facilitate an increase in compression sensitivity, relative to the material used to form the cavities (e.g., 100 times increase, as may be applicable to sensing pressure changes of less than about 1 Pa). The increase in conductance may, for example, be effected by conforming surfaces of the structures to surfaces between the structures and/or between the structures and the electrode.

In some embodiments, the structures are between two surfaces and effect the change in respective surface areas in response to a change in pressure applied to one of the surfaces, causing compression or expansion of the structures. In some implementations, one of the two surfaces includes the electrode, and in other implementations the other one of the two surfaces includes another electrode. The electrode or electrodes provide the change in electrical conductivity as a change in conductivity with one or both electrodes.

In another embodiment, the structures are located between two surfaces and effect the change in respective surface areas in response to a change in pressure applied to one of the surfaces, causing compression or expansion of the structures, in which one of the two surfaces includes the electrode, and in which one of the two surfaces includes another electrode (e.g., one surface may include both electrodes). The electrodes and the structures provide the change in electrical conductivity as a change in conductivity between the electrodes.

In some embodiments, the structures respond to an increase in pressure by elastically compressing and, via the elastic compression, provide an increase in conductance by increasing the surface area contact between the structures and the electrode. The structures respond to a decrease in pressure by elastically expanding and, via the elastic expanding, provide a decrease in conductance by decreasing the surface area contact between the structures and the electrode.

In some embodiments, the structures operate in an uncompressed mode in which the structures have a first amount of surface area that conforms with surfaces of other structures and/or the electrode, the first amount of surface area providing a first conductance between the structures and the electrode. The structures operate in a compressed mode in which the structures have a second amount of surface area that conforms with surfaces of other structures and/or the electrode, the second amount of surface area being greater than the first amount of surface area and providing a second conductance between the first and second electrodes that is higher than the first conductance.

Cavities as discussed with various embodiments herein may be implemented in a variety of manners. In some implementations, at least some structures define cavities, with at least one of the cavities being different in size relative to at least another one of the cavities. The cavities may be filled with a gas, or may be generally devoid of material. For instance, the structures may include a polymer film that defines the cavities.

Certain embodiments are directed to bandage-like passive or active wireless devices containing a sensor, such as described herein. The device may, for example, be powered by a wrist band-type device and collect sensor data.

Various other embodiments are directed to imparting elasticity to a rigid conducting polymer by forming hollow-sphere microstructures. Various aspects are directed to forming these microstructures using a multi-phase synthesis approach. Facile solution gelation synthesis is used to fabricate and pattern large area EMCP thin films through casting. Using this approach, an interconnected-hollow-sphere structure can be formed, permitting the conducting polymer (e.g., PPy) to elastically deform and recover upon the application and release of external pressure. This approach may, for example, be implemented to provide a resistive pressure sensor based on a contact-resistance mechanism that may be generally independent from a bulk-piezoresistance effect, and achieve high sensitivity, low threshold, low hysteresis, excellent cyclability, and temperature-stable sensing.

In some embodiments, a pressure sensor employing materials as above is formed by patterning the surface of an EMCP thin film having hollow-sphere microstructures. This approach can impart sensitivity to approximately 56.0-133.1 kPa$^{-1}$ in the low-pressure regime (<30 Pa), or higher, which can be used to sense low pressure variations (e.g., of 0.8 Pa).

Various embodiments are directed to an apparatus, system, method of use, method of making, or material directed to one or more of the following aspects, as may be implemented separately or in connection with one or more of the following aspects or other embodiments discussed and/or shown in this patent document:

pressure sensing;
electronic skin devices;
pressure sensors that can mimic and/or surpass subtle pressure sensing properties of natural skin;
elastic, microstructured conducting polymer thin films;
structures formed via PPy hydrogel using a multi-phase reaction that produces hollow-sphere microstructures that endows PPy with structure-derived elasticity and a low effective elastic modulus;
contact-area pressure sensing of pressure changes of less than 1 Pa;
pressure sensing with one or more of a short response time, good reproducibility, excellent cycling stability, and temperature-stable sensing;
piezoresistive sensors;
sensors having an active layer that is both conductive and elastic and that imparts ultra-high sensitivity and reproducible sensing characteristics; and a pressure sensor insensitive to temperature changes between a range, such as from about −10° C. to 100° C.; and rendering stiff and brittle materials that exhibit low piezoresistance implementable as tunable piezoresistive sensing devices (e.g., with piezoresistive sensitivity in response to pressure that is at least 100 times greater than the low piezoresistance) capable of withstanding large effective strains and stresses, via multi-phase generation of structures having outer walls of the materials and defining cavities therein.

Turning now to the figures, FIGS. 1A and 1B show a pressure-sensing apparatus 100 in respective states of compression, in accordance with another example embodiment. The apparatus includes compressible structures, including structure 110 labeled by way of example, between two structures 120 and 130. One or both of these surfaces 120 and 130 is conductive, and functions as an electrode. The compressible structures are conductive and operate to compress/deform in response to applied pressure to one or both of the surfaces 120 and 130. In some embodiments, the apparatus 100 also includes a circuit 140 operable to detect changes in impedance relative to changes in the contact area of the conductive structures (shown by way of example as detecting changes across the surfaces 120 and 130).

Referring specifically to FIG. 1B, the conductive structures deform in response to an applied pressure, in a manner that increases surface contact area between the structures and the surfaces 120 and 130, thereby providing for an increase in surface contact area to the electrode. This increase in surface contact area is provided as an electrical impedance-type change, which can be detected and used to characterize the amount of deflection of the conductive structures. This deflection, along with known characteristics of the structures, is used to characterize an amount of pressure on one or both of the surfaces 120 and 130. By way of example, the apparatus 100 is shown in FIG. 1B with pressure being applied to upper surface 120 and lower surface 130 being fixed. Resulting changes in conductivity across the surfaces 120 and 130, via conductive pathways formed by the conductive structures (including 110) as affected by the contact area with the surfaces.

The apparatus 100 is implemented in a variety of embodiments, to suit particular applications, and may be modified accordingly. For instance, the conductive structures including structure 110 can be implemented in a pressure-sensitive film. Electrodes may be implemented in one or both of the surfaces (e.g., with each surface including an electrode, or with one of the surfaces including more than one electrode). Interactions between the film and one or more electrodes can be detected and used to characterize pressure. Further, the apparatus 100 may be used in a variety of pressure sensors, such as that shown in FIG. 3.

Figure 2:
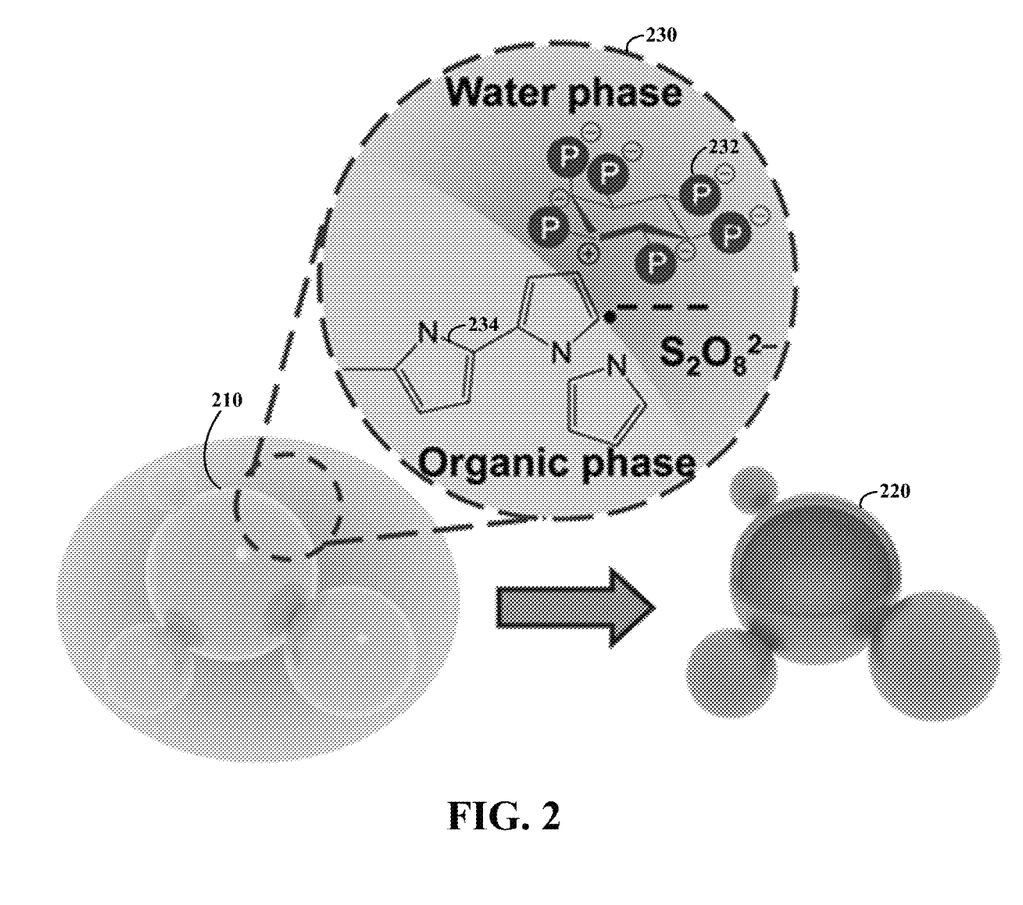
FIG. 2 shows pressure sensing structures and related fabrication, in accordance with another example embodiment.

FIG. 2 shows pressure sensing structures and related fabrication, in accordance with another example embodiment. Conductive structures are generated to form an EMCP thin film by mixing and casting a bi-component PPy gel precursor. A multi-phase reaction mechanism is employed to achieve a hollow-sphere morphology of conductive structures, with structure 210 shown by way of example in solution and a resulting hollow-sphere structure 220 shown in a final product.

In some implementations, an aqueous solution of oxidative reagent is mixed with a solution containing a mixture of a pyrrole monomer, isopropanol, and phytic acid. The phytic acid molecule acts as a dopant and crosslinker in the reaction (e.g., as consistent with one or more approaches as discussed in the above-referenced provisional application). An emulsion is formed upon mixing due to phase separation between organic and aqueous components, as represented at inset 230 with water phase component 232 and organic component 234. With the polymerization of PPy, the solution undergoes a color change from light brown (the color of phytic acid) to black (the color of PPy) and gelates (e.g., in approximately 3 s). After exchanging the impurities with deionized water, a hydrogel is formed from the PPy gel. This facile solution gelation mechanism can be used to fabricate large area thin films (e.g., as large as or larger than 255 cm$^2$) with a casting process, and which may employ a blade coating or other large area coating method.

The resulting structure is a three-dimensional (3D) porous foam of dried PPy film. The PPy foam includes interconnected spheres, which may exhibit polydisperse diameters ranging from hundreds of nanometers to several microns and a thin-shell thickness of approximately 50 nm. Conductivity of about 0.5 S·cm$^{-1}$ can be achieved using a standard four-point probe method at room temperature. PPy thin films with hollow-spheres and/or solid spheres of different diameters, size dispersions, and shell thickness can be prepared by choosing different solvents, such as including 1-butanol, t-butanol, s-butanol, and t-amyl alcohol, as may be characterized in the underlying provisional application.

FIGS. 3A-3D show an approach to manufacturing a structured film, in accordance with another example embodiment. At FIG. 3A, a mold 300 with inverse features is provided, and the mold is filled with a precursor 310 at FIG. 3B. The precursor may, for example, be cast in the mold 300, and takes the shape of the inverse features therein. At FIG. 3C, the precursor has been used to effect PPy hydrogel gelation, forming a structured film 320. At FIG. 3D, the structured film 320 has been removed from the mold 300, and can be implemented accordingly. The structured film 320 includes compressible features, such as those shown in FIGS. 1A and 1B, which may be implemented as solid, with cavities or both as characterized herein. As the film 320 is compressed, the structures therein change in surface area with regard to contact of the film to a conductive surface, which changes impedance between the film and the surface and therein provides a detectable electrical characteristics. These electrical characteristics can then be used to identify or otherwise characterize pressure or force upon the film 320 that caused the compression.

The following discussion may be implemented in connection with one or more experimental-type embodiments, and otherwise with embodiments described herein, such as in forming or using apparatuses described above.

In various embodiments, a PPy film having structural components with cavities therein exhibits compressive stress ($\sigma$, the applied force divided by the film area) as a function of strain ($\in$, the compressed distance divided by the film thickness), with maximum $\sigma$ and $\in$ values of approximately 20 kPa and 14%, respectively. An effective elastic modulus ($E_{eff}$) is the slope of the stress vs strain plot, which is influenced by the materials properties, morphology, and roughness of the EMCP. The EMCP exhibits an $E_{eff}$ that is low at low pressures and increases with compression. The $E_{eff}$ at 5 kPa is 0.19 MPa, which may be similar to low-modulus elastomers such as polydimethylsiloxane. The $E_{eff}$ normalized by the density is approximately 1.11 MPa cm$^3$ g$^{-1}$ (at 5 kPa), which may be lower than values for the modulus of foams based on polymers and carbon nanotubes. In some implementations, a "preconditioning" step can be implemented, during which a large force is applied so that subsequent performance is reproducible.

Hysteresis in both mechanical and electrical properties may be quantified as the maximum difference between the loading and unloading curve divided by the full-scale output. In some implementations, the hysteresis of EMCP is found to be ~11.0% at a maximum pressure of 20 kPa (e.g., as in FIG. S6 of Appendix B of the above-referenced provisional application). Hysteresis can be reduced at lower applied strains, demonstrating the effectiveness of the sensor in the low-pressure regime. Hysteresis in the mechanical properties is caused by viscoelasticity of the material, which can be characterized using dynamic mechanical analysis (DMA). DMA measurements conducted at 25° C. over a frequency range from 0.1 Hz to 200 Hz (as in FIG. S7 of the above-referenced Appendix B). The storage and loss moduli are similar to that observed in soft polymer foams. The loss tangent can be defined as the loss modulus divided by the storage modulus, and can be used as a measure of hysteresis. The loss tangent varies from ~0.1 to 0.2 throughout the measured frequency range, which is consistent with a hysteresis value of 11.0% extracted from stress-strain data.

In particular embodiments, EMCP films are assembled into resistive-type pressure sensors by sandwiching the film between a copper foil and an indium tin oxide (ITO)-coated conductive flexible poly(ethyleneterephthalate) (PET) sheet (e.g., into a square, pressure-sensitive pad of about 1 cm$^2$ in size), with exemplary response as may be achieved in connection with FIG. 2B of Appendix A in the above-referenced provisional patent application. The pressure sensitivity S can be defined as the slope of the resistance versus pressure (S=dR/dp), where R denotes the resistance and P denotes the applied pressure. The resistance vs. pressure curve revealed a similar power law dependence of sensitivity on pressure. In the <100 Pa pressure range, the device exhibits ultra-high sensitivity of approximately 7.7-41.9 kPa$^{-1}$. At pressures>1 kPa, the sensitivity drops to <0.4 kPa$^{-1}$. The dependence of log R on log P and log S on log P is linear over a wide pressure range extending to 100 kPa (e.g., as shown in FIG. S9 in Appendix B noted above). Various implementations provide a constant mathematical power law relationship between S and P, with the progressive reduction of S facilitating ultra-high sensitivity at very low loads and a large range of detectable pressures at higher loads (for which high sensitivity is not required). Immediate response to both external loading and unloading can be provided, with response and relaxation times faster than ~50 ms.

In connection with various embodiments, it has been recognized/discovered that various pressure sensors as characterized herein may be operated predominantly through a contact resistance mechanism, in which piezoresistance originates from physical contacts at discrete spots between the asperities of conductive structures such as an EMCP film and an electrode surface.

In various implementations, an inverse linear relationship between log R and log P is provided by a device as consistent with one or more embodiments herein, consistent with the contact resistance equation:

$$R_c = \{\rho^2 \eta \pi H/4F\}^{1/2}, \qquad (1)$$

where $R_c$ denotes the contact resistance, $\rho$ is the electrical resistivity and $\eta$ is an empirical coefficient of order unity, H is the hardness of the material, and F is the load. This contact area can be set by the physical contact of asperities projecting from the surface and related deformation of a conductive structure as characterized herein. The contact area between an EMCP apparatus and the electrode is directly proportional to the load and independent of the apparent area, enabling the sensing of an applied pressure. The spherical asperities of such an EMCP thin film closely resemble the geometric model employed in a theoretical simulation of contact resistance, resulting in a nearly perfect inverse linear relationship between log R and log P. In various implementations, the roughness of an interface between a conductive structure and electrode used herein is used to set or tune the pressure sensing.

Using physical contact to set impedance characteristics as noted in accordance with embodiments herein, may be used to provide sensing characteristics which are not affected by thermal expansion. In certain embodiments involving PPy, temperature stability is enhanced through the use of non-volatile dopants which can provide stable conductivities at temperatures of over 100° C. In some implementations, phytic acid (a high molecular weight non-volatile dopant, MW=660.4 g·mol$^{-1}$) facilitates temperature stability. In certain implementations, a crosslinking effect promotes temperature stability, such as by interacting phytic acid molecules with more than one PPy chain. Device stability over time can also be enhanced using phytic acid dopants and/or encapsulation.

Figure 3A:
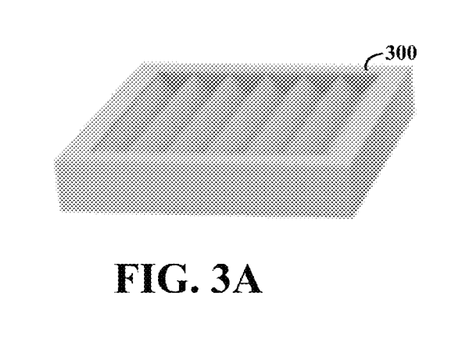
FIG. 3A shows a mold.
Figure 3B:
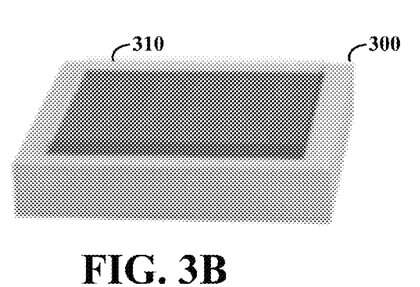
FIG. 3B shows the mold with a precursor.
Figure 3C:
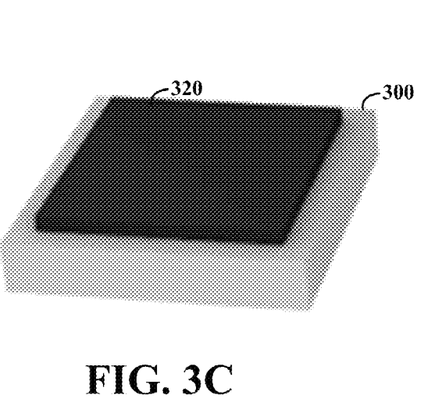
FIG. 3C shows gelation.
Figure 3D:
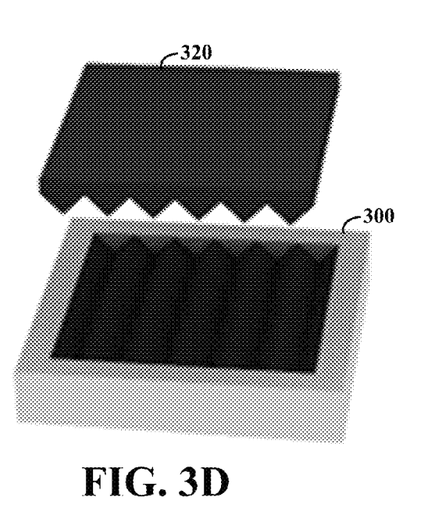
FIG. 3D shows a film as removed from the mold.

In some embodiments, the sensitivity of pressure sensors as characterized herein are improved by adapting a microstructuring strategy by patterning the surface of the EMCP thin film, such as described in Mannsfeld, S. C. B. et al., "Highly sensitive flexible pressure sensors with microstructured rubber dielectric layers," *Nat. Mater.* 9, 859-864 (2010), which is fully incorporated herein by reference. The microstructured surface can be fabricated by molding a surface topology (e.g., lines with a triangular cross-section profile with 0.5 mm height and 1 mm width) onto PPy films before gelling, such as shown in FIGS. 3A-D herein and/or in FIG. 3a of Appendix A noted above. The PPy hydrogel replicates the microstructures regularly and uniformly across the full size of the wafer mold. FIG. 3b in Appendix A exemplifies piezoresistive response to pressure of such a patterned EMCP device. In some embodiments, a sensitivity of approximately 56.0-133.1 kPa$^{-1}$) is achieved in the low-pressure regime (<30 Pa). In certain embodiments, high sensitivity is retained using elastic spacers to control the contact between two electrodes in encapsulated devices, with spacers such as insulating polymer bars, dots or a mesh. In other embodiments, high sensitivity is achieved by imparting an electrode surface with high roughness to retain high sensitivity over a larger pressure range so that a small preload will not be detrimental to the device sensing properties, and/or microstructuring of a sensing layer such as a PPy layer.

In certain human-computer interface applications, the sensor is scaled to an array configuration of several pixels to collect spatially resolved pressure information. Such a matrix of pressure sensors demonstrates the potential for applying our sensor networks in human-electronics interfaces and electronic skin devices.

Materials used in connection with one or more embodiments may be manufactured using a variety of approaches. In certain embodiments, a 0.274 g (1.2 mmol) mass of ammonium persulfate (Aldrich) is dissolved in 0.5 mL DI water for a first solution A. A second solution B is prepared by mixing 84 μL pyrrole (99%, Aldrich) in 0.5 mL isopropanol, followed by 0.184 mL phytic acid (50%, wt % in water, Aldrich). The reaction vial and A/B solutions are rapidly cooled to roughly 4° C. using dry ice. The A and B solutions are then quickly mixed, cast into a Petri dish, and allowed to react for 2 h. To remove excess ions, acid, and by-products, the PPy gel thin film is further purified by sequential immersion in excess ethanol (12 h) and DI water (24 h). The PPy film is dried at 60° C. under vacuum and rehydrated to form a hydrogel by adding DI water. The dehydrated PPy film is prepared by drying in the ambient environment for 3 days. The patterned PPy film is prepared by casting the mixed precursor solution onto a PDMS mold with a 1-mm period and 0.5-mm height embossment. The patterned PPy hydrogel is peeled off after freezing.

In some implementations, EMCP films are assembled into a resistive-type pressure sensor by sandwiching them between a copper foil and an indium tin oxide (ITO)-coated conductive flexible poly(ethyleneterephthalate) (PET) sheet. The size of the square pressure-sensitive pad may be 1 cm$^2$. Devices used for cycling and temperature-dependent testing may be encapsulated in a PET enclosure. ITO can be used for both of the electrodes in the device used for the temperature-dependence experiments to avoid the large thermal expansion effect of copper electrodes.

Various blocks, modules or other circuits may be implemented to carry out one or more of the operations and activities described herein and/or shown in the appended figures. In these contexts, a "block" (also sometimes "logic circuitry" or "module") is a circuit that carries out one or more of these or related operations/activities (e.g., coupling a sensor signal, coupling multiple sensors, or processing one or more outputs from a sensor or sensors). For example, in certain of the embodiments herein, one or more modules are discrete logic circuits or programmable logic circuits configured and arranged for implementing these operations/activities, as in circuit modules coupled to sensors as shown in the figures. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Such operations may be carried out, for example, in applications such as for electronic skin and various other pressure sensors, and in various applications including, for example, industrial applications, experimental applications, analysis applications, and prosthetics.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, a variety of different sensors may be combined, and a variety of types of sensor structures (e.g., that form cavities) may be used for different implementations or combined. The structure of the cavities can be modified by tuning the chemical synthesis method in order to optimize the electrical conductivity or mechanical properties for a particular application. The thickness of the shell and the total thickness of the electrode may be modified to tune the conductivity and pressure response range. In addition, the various embodiments described herein (including those in the Appendices) may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
   an electrode; and
   a plurality of structures having respective surface areas that contact at least one of the electrode and other ones of the structures, the structures being configured and arranged with the electrode to provide an electrical indication of pressure by
      effecting a change in the respective surface areas relative to the electrode in response to an elastic compression or expansion of the structures, and
      providing a change in electrical impedance between the structures and the electrode that is based on the change in the respective surface areas.

2. The apparatus of claim 1, wherein the structures are between two surfaces and are configured and arranged to effect the change in respective surface areas in response to a change in pressure applied to one of the surfaces causing compression or expansion of the structures.

3. The apparatus of claim 2, wherein one of the two surfaces includes the electrode, and further including a three-dimensional polymer film comprising the plurality of structures between the two surfaces, and wherein at least a portion of the plurality of structures includes hollow-polymer structures that define enclosed cavities.

4. The apparatus of claim 3, wherein the other one of the two surfaces includes another electrode, and the electrodes are configured and arranged with the structures to provide the change in electrical impedance as a change in conductivity between the electrodes that is based upon an amount of surface area of the structures that contacts the electrodes.

5. The apparatus of claim 1, wherein
   the structures are between two surfaces and are configured and arranged to effect the change in respective surface areas in response to a change in pressure applied to one of the surfaces causing compression or expansion of the structures,
   one of the two surfaces includes the electrode,
   one of the two surfaces includes another electrode, and
   the electrodes are configured and arranged with the structures to provide the change in electrical impedance as a change in conductivity between the electrodes.

6. The apparatus of claim 1, wherein the structures are configured and arranged to
   respond to an increase in pressure by elastically compressing and, via the elastic compression, provide an increase in conductance by increasing the surface area contact between the structures and the electrode, and
   respond to a decrease in pressure by elastically expanding and, via the elastic expanding, provide a decrease in conductance by decreasing the surface area contact between the structures and the electrode.

7. The apparatus of claim 1, wherein at least some structures define cavities by forming sidewalls that enclose a cavity that has a volume and that is configured and arranged to:
   compress in response to an increase in pressure, and
   expand in response to a decrease in pressure.

8. The apparatus of claim 1, wherein the plurality of structures define a porous polymer region including:
   a polymer film; and
   cavities defined by at least some of the plurality of structures that facilitate deformation and exhibit electrical sensitivity to compression, via deformation of the cavities and related changes in the surface area, which is about 100 times more sensitive than a sensitivity to compression exhibited by a material that forms the structures.

9. The apparatus of claim 1, wherein the structures are configured and arranged to provide an increase in conductance by conforming surfaces of the structures to surfaces of at least two of: one of the structures and the electrode.

10. The apparatus of claim 1, wherein the structures are configured and arranged to
    operate in an uncompressed mode in which the structures have a first amount of surface area that conforms with surfaces of at least two of: other ones of the structures and the electrode, the first amount of surface area providing a first conductance between the structures and the electrode, and
    operate in a compressed mode in which the structures have a second amount of surface area that conforms with surfaces of at least two of: other ones of the structures and the electrode, the second amount of surface area being greater than the first amount of surface area and providing a second conductance between the structures and the electrode that is higher than the first conductance.

11. The apparatus of claim 1, wherein at least some structures define enclosed cavities and are configured and arranged to compress or expand in response to changes in pressure, with at least one of the enclosed cavities being different in size relative to at least another one of the enclosed cavities.

12. The apparatus of claim 1, wherein at least some structures define cavities and the cavities enclose a gas.

13. The apparatus of claim 1, wherein the structures are configured and arranged with the electrode to provide the electrical indication of pressure by providing the change in electrical impedance between the structures and the electrode in response to changes in pressure of less than about 1 Pa.

14. The apparatus of claim 1, wherein providing a change in electrical impedance between the structures and the electrode includes providing a change in resistance in response to deformation of the structures that changes the surface areas.

15. A method comprising:
    forming an electrode; and
    forming a polymer film comprising a plurality of hollow structures having respective surface areas that contact at least one of: the electrode and other ones of the structures, in which the structures are configured and arranged with the electrode to provide an electrical indication of pressure by
       effecting a change in the respective surface areas relative to the electrode in response to an elastic deformation of the structures, and
       providing a change in electrical impedance between the structures and the electrode based on the change in the respective surface areas.

16. The method of claim 15, wherein forming the polymer film comprising the plurality of hollow structures includes forming interconnected cavities defined by each of the hollow structures that facilitate deformation of the polymer film and configuring the interconnected cavities relative to the electrode to provide the electrical indication of pressure.

17. The method of claim 16, wherein forming cavities defined by each of the hollow structures includes selecting one of a plurality of templates based upon a set pressure sensitivity, and using the selected template to form the cavities and wherein the polymer film includes a three-dimensional porous polymer film that defines the interconnected cavities.

18. The method of claim 15, wherein forming the plurality of hollow structures includes forming hollow-sphere shaped structures of different sizes.

19. The method of claim 15, further including rendering a linear stress-strain response of the structures by cyclically compressing and releasing the structures.

20. A method of using an apparatus having an electrode and polymer film comprising a plurality of hollow structures having respective surface areas that contact at least one of the electrode and other ones of the structures, the method comprising:
 providing an electrical indication of pressure by
  effecting a change in the respective surface areas relative to the electrode in response to an elastic compression or expansion of the hollow structures, and
  providing a change in electrical impedance between the hollow structures and the electrode based on the change in the respective surface areas.

\* \* \* \* \*

UNITED STATES PATENT AND TRADEMARK OFFICE
CERTIFICATE OF CORRECTION

PATENT NO.         : 9,453,774 B2
APPLICATION NO.    : 14/573928
DATED              : September 27, 2016
INVENTOR(S)        : Bao et al.

Page 1 of 1

It is certified that error appears in the above-identified patent and that said Letters Patent is hereby corrected as shown below:

In the Specification

Column 1, beginning at Line 4, please insert the following:

--FEDERALLY-SPONSORED RESEARCH AND DEVELOPMENT
This invention was made with Government support under contract FA9550-12-1-0190 awarded by the Air Force Office of Scientific Research and under contract 1101901 awarded by the National Science Foundation. The Government has certain rights in the invention.--

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*